United States Patent [19]

Morishita et al.

[11] 4,000,980

[45] Jan. 4, 1977

[54] ABRASION-RESISTANT SLIDING MATERIAL

[75] Inventors: Tsuyoshi Morishita; Toshio Yamada, both of Hiroshima, Japan

[73] Assignee: Toyo Kogyo Co., Ltd., Hiroshima, Japan

[22] Filed: Feb. 27, 1975

[21] Appl. No.: 553,807

[30] Foreign Application Priority Data

Mar. 1, 1974 Japan .............................. 49-25018

[52] U.S. Cl. .............................. 29/182.5; 29/182.8; 75/201; 75/202; 75/204

[51] Int. Cl.$^2$ ......................................... C22C 29/00

[58] Field of Search ............. 29/182, 182.5, 182.8; 75/200, 211, 201, 202, 204

[56] References Cited

UNITED STATES PATENTS

| | | | |
|---|---|---|---|
| 2,213,523 | 9/1940 | Jones | 75/200 |
| 2,226,520 | 12/1940 | Lenel | 75/200 |

OTHER PUBLICATIONS

Jones, *Fundamental Principles of Powder Metallurgy* 1960, 695 Jb pp.863–867.

*Primary Examiner*—Brooks H. Hunt
*Attorney, Agent, or Firm*—Fleit & Jacobson

[57] ABSTRACT

An abrasion-resistant sliding material is produced by forming a powdery mixture of (a) 70–98% of a eutectic alloy consisting of 0.2–3.0% of boron, 1.0–4.0% of carbon, with the balance being iron, the alloy having a particle size finer than 200 mesh and (b) 2–30% of a second eutectic alloy consisting of 3.0–7.0% phosphorus, 0.5–2.5% of carbon, with the balance being iron, this second alloy also having a particle size finer than 200 mesh, compression molding the resulting mixture into a desired shape at a pressure of 0.5–3.0 t/cm$^2$, and sintering the resulting molded product at 950°–1130° C. for at least 5 minutes in an atmosphere of an inert gas (e.g., argon, nitrogen, hydrogen) or in a vacuum. The final product is characterized in that it has a porosity not exceeding 7.0%, a pore size not exceeding 50$\mu$ in diameter, with its structure including portions of iron compounds [Fe$_3$(B.C.)], portions where iron and iron compounds are copresent [Fe + Fe$_3$ (B.P.C.)] and in which the P content is higher at the boundary areas than at the central areas, and portions of fine pores.

8 Claims, 5 Drawing Figures

X200

X200

X200

ABRASION-RESISTANT SLIDING MATERIAL

This invention relates to a sliding material which is excellent in abrasion resistance and anti-seizure property and does not damage a material in sliding contact therewith, and, more particularly, to a sliding material composed of a sintered product of a mixture of two ternary eutectic alloys.

Further, the invention relates to a sintered sliding material which can be used effectively for production of various sealing members for internal combustion engines, especially piston rings and apex seals.

Sintered products of mixtures comprising, as the basic metal, particles of a carbide such as WC, TiC or the like and a binder metal such as Co, Cu or the like have heretofore been known and used as sintered alloys having a high abrasion resistance. However, since carbides in these sintered alloys have a very high hardness, it sometimes happens that the alloy materials cause the materials with which they are in sliding contact (hereinafter referred to as "mating material") to wear drastically. Further, the Co or Cu used as the binder metal causes seizure with the mating material at high temperatures. These sintered alloy materials are also defective in that their costs are very high because the raw materials are expensive.

There are also known in the art melt-cast materials in which an intermetallic compound is dispersed to reduce the metal-to-metal contact, prevent seizure and thus reduce abrasion and wearing. As one of such materials, there can be mentioned high phosphorus cast iron. However, abrasion, wearing and seizure occurs in these materials as the product PV of the pressure P imposed on the sliding surface and the sliding speed V increases.

It is therefore a primary object of this invention to provide a sliding material which is cheap, has good properties and does not give rise to the above-mentioned defects involved in conventional sliding materials even when the material is used under very severe conditions.

Another object of this invention is to provide a sintered alloy having good properties as a sliding material, which is prepared by using a powdery Fe-B-C eutectic alloy as the basic metal, incorporating therein a powdery Fe-P-C eutectic alloy, compression molding the mixture, and sintering the molded mixture at a prescribed temperature.

Still another object of this invention is to provide a sintered alloy comprising uniformly dispersed (Fe + $Fe_3(B,P,C)$), $Fe_3(B,C)$ and fine pores, which is prepared by mixing a powdery Fe-B-C eutectic alloy comprising 0.2 to 3.0% (all of "%" used in the instant specification being by weight) of B and 1.0 to 4.0% of C with the balance being Fe with a powdery Fe-P-C eutectic alloy comprising 3.0 to 7.0% of P and 0.5 to 2.5% of C with the balance being Fe so that the amount of the powdery Fe-B-C alloy accounts for 70 to 98% of the total weight of the mixture, compression molding the resulting powdery mixture and sintering the molded mixture at a temperature of 950° to 1130° C.

This invention will now be described in detail.

The Fe-B-C eutectic alloy to be used as the base metal in this invention comprises 0.2 to 3.0% of B and 1.0 to 4.0% of C with the balance being Fe. The criticality of these percentage ranges is described below.

B is an element important for attaining a sufficient abrasion resistance. When the B content is lower than 0.2%, the proportion of the metal component increases and seizure is readily caused to occur. In contrast, when the B content exceeds 3.0%, the resulting material becomes too brittle and it cannot be put into practical use.

C is an element important for formation of carbides. When the C content is lower than 1.0%, the amount of the carbide formed is very small and the proportion of the metal component increases. Therefore, seizure is readily caused to occur when the resulting material is actually employed as a sliding material. Moreover, the abrasion resistance of the resulting material is lowered. In contrast, when the C content exceeds 4.0%, large quantities of graphite and blowholes are formed in the melting step, and further, the wetability between the Fe-B-C eutectic alloy and the Fe-P-C eutectic alloy is lowered and hence, the resulting material is insufficient in strength and abrasion resistance.

The Fe-P-C eutectic alloy to be used as the binder metal in this invention commprises 3.0 to 7.0% of P and 0.5 to 2.5% of C with the balance being Fe. The criticality of these percentage ranges is described below.

P is an important element because it improves the abrasion resistance in the form of a phosphide such as $Fe_3P$. When the P content is lower than 3.0%, the proportion of the metal component increases and seizure is readily caused to occur. When the P content exceeds 7.0%, appreciable amount of blowholes are produced when the Fe-P-C eutectic alloy is molten and the wettability between Fe-P-C eutectic alloy and Fe-B-C eutectic alloy is lowered resulting in poor sintering property. Therefore, good sintering cannot be attained and both the strength and the abrasion resistance are decreased in the resulting sliding material.

C is important in providing anti-wear property of the resulting material since it produces a carbonized element. When C content is less than 0.5%, there will exist increased percentages of metal part and, when C is more than 2.5%, increased amount of graphite and blowholes are produced during the melting process and, the wettability with the Fe-B-C eutectic alloy is lowered resulting in poor sintering property and decreased strength and anti-wear property.

These two eutectic alloys may be any of those prepared according to customary methods such as the casting method.

Each of the two eutectic alloys is pulverized to a powdery form having a particle size which will pass a 200 mesh sieve according to known pulverizing methods. Neither the Fe-B-C eutectic alloy nor the Fe-P-C eutectic alloy exhibit appreciable plastic deformation when particles having a particle size which will not pass a 200 mesh sieve are present. Accordingly, when a mixture of the two eutectic alloys including particles having a size which will not pass a 200 mesh sieve is compression molded, large pores are left in the molded article, and even when the molded article is then sintered and a liquid phase of the Fe-P-C eutectic alloy is formed, these pores are not completely filled with such liquid phase and large pores are left even in the sintered product. Therefore, the product has a low density and it is impossible to obtain sufficient strength and abrasion resistance.

When both the eutectic alloys are pulverized into very fine particles, the powder is activated. However, the objects of this invention can be fully attained even when such activated powder is employed. Accordingly, in this invention, it is sufficient that both the eutectic alloys be pulverized to a powdery form having a particle size of 200 mesh or smaller.

The so pulverized Fe-B-C eutectic alloy and Fe-P-C eutectic alloy of compositions and sizes mentioned above are mixed so that the amount of the powdery Fe-P-C eutectic alloy accounts for 2 to 30% of the resulting mixture, and the mixture is blended sufficiently.

It is indispensable that the proportion of the Fe-P-C eutectic alloy as the binder metal should be 2 to 30%. When the proportion of this eutectic alloy is lower than 2%, the amount of the liquid phase of the binder formed in the sintering step is insufficient and good sintering cannot be attained, with the result that both the strength and abrasion resistance are insufficient in the sintered product. In contrast, when the proportion of the Fe-P-C eutectic alloy exceeds 30%, the amount of the liquid phase of the binder formed in the sintering step is too large and the product has too large deformation. Accordingly, post processing costs are increased. With a view to obtaining a sintered product having practical properties as a sliding material, it is preferred that the proportion of the Fe-P-C eutectic alloy be 5 to 20%.

The so obtained powdery mixture is charged into a mold having a prescribed configuration, and it is compression molded under a compression pressure of 0.5 to 3.0 t/cm$^2$. At a compression pressure lower that 0.5 t/cm$^2$ the resulting molded article has low strength and cannot be handled with ease. When the molding is performed under a compression pressure higher than 3.0 t/cm$^2$, the density is not proportionally increased to the degree that might be expected from the compression pressure, and cracks are formed in the resulting molded product.

The so compression molded product is sintered at 950° to 1130° C. in a suitable atmosphere for at least 5 minutes. As the sintering atmosphere, there can be employed an inert gas such as argon or nitrogen, hydrogen gas, an ammonia decomposition gas or a vacuum. The results of our experiments show that from the view of the porosity of the sintered product, the order of preference runs from inert gases, ammonia decomposition gas, hydrogen gas and vacuum which resulted in the best product. If the sintering time is shorter than 5 minutes, the liquid phase of the Fe-P-C eutectic alloy is not sufficiently formed and hence, a product having a sufficient strength cannot be obtained. The upper limit of the sintering time is not particularly criticaly in this invention. The reason why the sintering temperature is limited to 950° to 1130° C in this invention is that the crystal-forming temperature is 950° C in the Fe-P-C eutectic alloy and the crystal-forming temperature is 1130° C in the Fe-B-C eutectic alloy. When the temperature is lower than 950° C, the Fe-P-C eutectic alloy is not converted into a liquid phase and it has no effect as the binder. When the temperature is higher than 1130° C, the base metal is also molten, and hence, the intended effects cannot be attained and such defects as cracks are formed when the melt is cooled.

In this invention, it is permissible to conduct pre-sintering prior to the above-mentioned sintering treatment.

The so obtained sintered product has a structure including portions of Fe compounds, namely the portions Fe$_3$(B,C), portions where Fe and Fe compounds are copresent, namely the portions (Fe + Fe(B,P,C)), and portions of fine pores.

In the sliding material of this invention, the porosity is not higher than 7.0%, and the pore size is not larger that 50$\mu$ in diameter. When the pore size is 30$\mu$ or smaller, the strength and the abrasion resistance are highly improved and an especially good sliding material is obtained.

Examples of this invention will now be described with reference to the accompanying drawings, in which.

EXAMPLE 1

| (1) | Fe-B-C Eutectic Alloy | 95% |
| | B | 1.83% |
| | C | 3.0% |
| | Fe | balance |
| (2) | Fe-P-C Eutectic Alloy | 5% |
| | P | 5.66% |
| | C | 1.6% |
| | Fe | balance |

Fe-B-C and Fe-P-C eutectic alloys were separately prepared by melting the above components. Each was then pulverized and sieved to recover particles passable through a 200-mesh sieve. The so pulverized alloys were mixed together at the above-mentioned mixing ration. An acetone solution containing camphor as a lubricant in an amount of 2% based on the alloy components was added to the powdery alloy mixture. The resulting mixture was dried and blended for 1 hour by means of a V-type mixer. The blended powdery mixture was compression molded into a form of 3.7 mm × 11 mm × 80 mm under a compression pressure of 2 t/cm$^2$, and was allowed to stand still in an argon atmosphere at 400° C for 20 minutes to effect pre-sintering. The pre-sintered mixture was then sintered at 1000° C for 30 minutes and gradually cooled.

The so obtained sintered alloy was characterized by density of 7.1 to 7.2 g/cc, a porosity of 6.0 to 6.3%, a pore size not exceeding 25$\mu$, a hardness Rc of 45 to 50 and a flexural strength of 55 to 60 Kg/mm$^2$. When it was subjected to the abrasion test, it exhibited the properties shown in FIG. 1. In this abrasion test, no damage to the surface of the chromium-plated article used as the mating material was observed.

Figure 2:
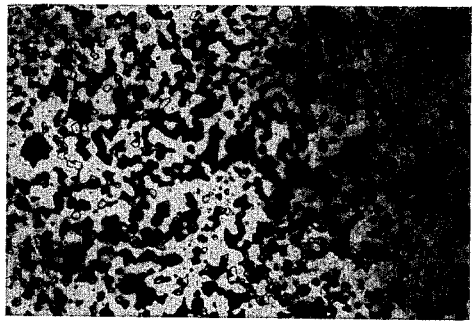
FIG. 2 is a photograph of a product of Example 1 taken by a photomicroscope of 200 magnifications.

The inner structure of the so obtained sintered alloy is shown in the microphotograph of FIG. 2, wherein the black spherical portions are pore portions, the gray portions are (Fe + Fe$_3$(B, P, C)) and the white portions are Fe$_3$ (B, C).

EXAMPLE 2

| (1) | Fe-B-C Eutectic Alloy | 90% |
| | B | 1.5% |
| | C | 4.0% |

|     |                   | -continued |
| --- | ----------------- | ---------- |
|     | Fe                | balance    |
| (2) | Fe-P-C Eutectic Alloy | 10%    |
|     | P                 | 4.73%      |
|     | C                 | 1.0%       |
|     | Fe                | balance    |

Fe-B-C and Fe-P-C eutectic alloys were prepared by melting the above components, and then pulverized and sieved to recover particles passable through a 350-mesh sieve. The so pulverized alloys were mixed together at the above-mentioned mixing ratio. An acetone solution containing camphor as a lubricant in an amount of 2% based on the alloy components was added to the powdery alloy mixture. The resulting mixture was dried and blended for 1 hour by means of a V-type mixer. The blended powdery mixture was compression molded into a form of 3.7 mm × 11 mm × 80 mm under a compression pressure of 2 t/cm², and the molded product was kept in vacuum of $2 \times 10^{-2}$ mmHg and the temperature was elevated to 980° C at a temperature-elevating rate of 3° C/min. The molded product was maintained at this temperature for 1 hour to effect sintering, and the sintered product was gradually cooled.

The so obtained sintered alloy was characterized by a density of 7.5 to 7.6 g/cc, a porosity of 0.5 to 0.8%, a pore size not exceeding 10μ, a hardness Rc of 50 to 55 and a flexural strength of 60 to 65 kg/mm². When it was subjected to the abrasion test, it exhibited the properties shown in FIG. 1. In this abrasion test, no damage to the surface of the chromium-plated article used as the mating material was observed.

Figure 3:
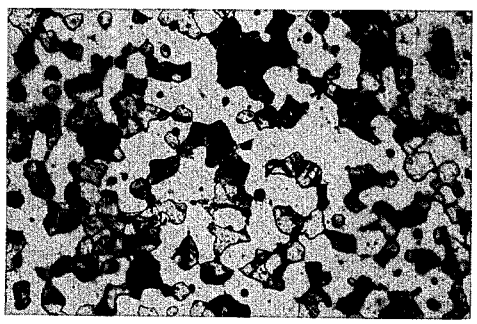
FIG. 3 is a photograph of a product of Example 2 taken by a photomicroscope of 200 magnifications.

The inner structure of the so obtained sintered alloy is shown in the microphotograph of FIG. 3, wherein the gray portions are (Fe + Fe$_3$(B,P,C)), the white portions are Fe$_3$(B,C) and the black portions are pore portions.

EXAMPLE 3

| (1) | Fe-B-C Eutectic Alloy | 80% |
| --- | --------------------- | --- |
|     | B                     | 0.92% |
|     | C                     | 1.2% |
|     | Fe                    | balance |
| (2) | Fe-P-C Eutectic Alloy | 20% |
|     | P                     | 3.1% |
|     | C                     | 1.3% |
|     | Fe                    | balance |

Fe-B-C and Fe-P-C eutectic alloys were prepared by melting the above components, and then pulverized and sieved to recover particles passable through a 350-mesh sieve. The so pulverized alloys were mixed together at the above-mentioned mixing ratio. An acetone solution containing camphor as a lubricant in an amount of 2% based on the alloy components was added to the powdery alloy mixture. The resulting mixture was dried and blended for 1 hour by means of a V-type mixer. The blended powdery mixture was compression molded into a form of 3.7 mm × 11 mm × 80 mm under a compression pressure of 2 t/cm². The molded product was pre-sintered in a hydrogen gas atmosphere at 400° C for 30 minutes and then sintered at 1080° C for 30 minutes. Then, the sintered product was gradually cooled.

Figure 1:
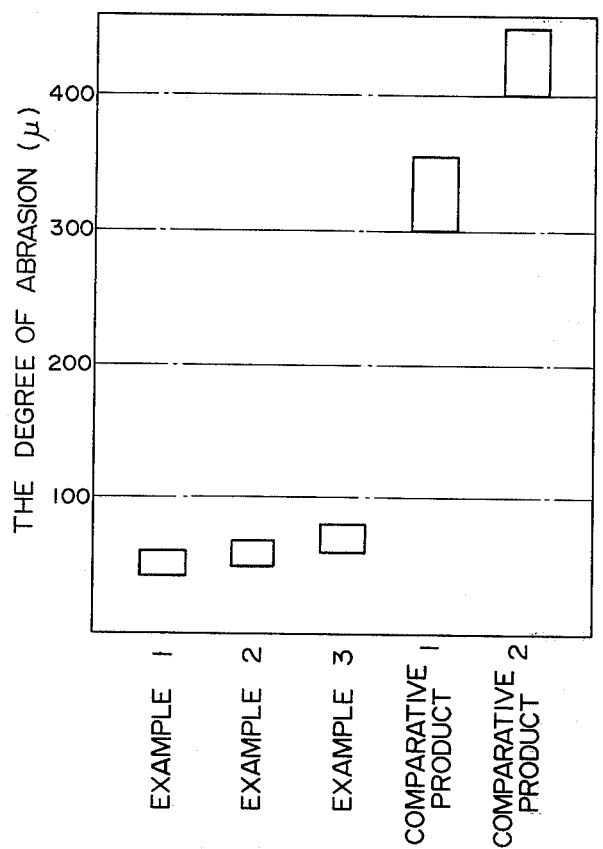
FIG. 1 is a diagram illustrating the results of abrasion test conducted both on products of this invention and on conventional products.

The so obtained sintered product was characterized by a density of 7.3 to 7.4 g/cc, a porosity of 3.8 to 2.9%, a pore size not exceeding 30μ, a hardness Rc of 40 to 45 and a flexural strength of 40 to 45 kg/mm². Results of the abrasion test conducted on the so obtained sintered product are shown in FIG. 1. In this abrasion test, no damage to the surface of a chromium-plated article used as the mating material was observed.

Figure 4:
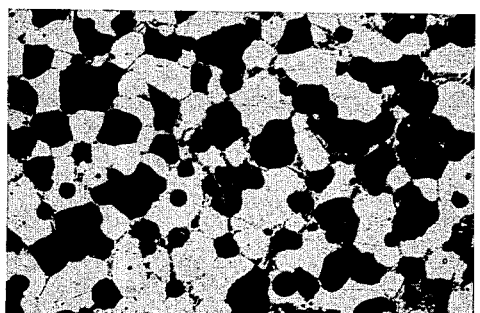
FIG. 4 is a photograph of a product of Example 3 taken by a photomicroscope of 200 magnifications.

The inner structure of the so obtained sintered alloy is shown in a photograph of FIG. 4, wherein the gray portions are (Fe + Fe$_3$(B,P,C)), the black portions are pore portions and the white portions are Fe$_3$(B,C).

Figure 5:
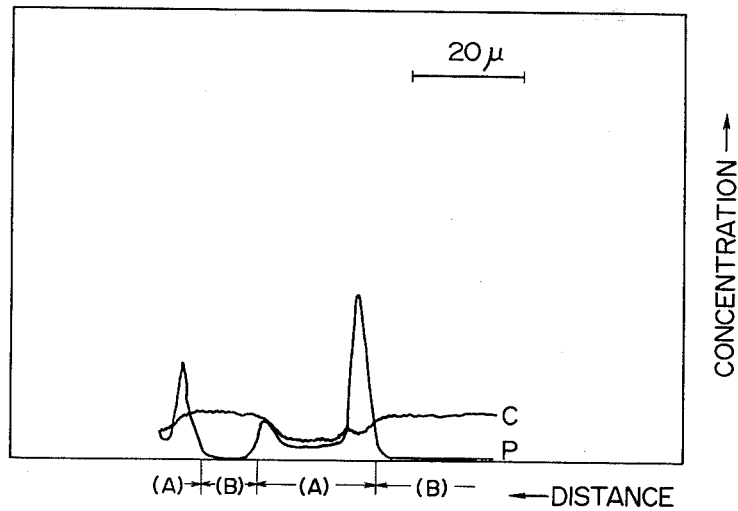
FIG. 5 is a diagram illustrating P and C concentrations in the structure of a product of this invention as determined by using an X-ray microanalyzer.

Results of the analysis made on products of this invention by using an X-ray microanalyzer to determine the distribution of P and C are shown in FIG. 5. In FIG. 5, the abscissa indicates the X-ray scanning distance and the ordinate indicates the concentrations of P and C. In the diagram of FIG. 5, A shows the (Fe + Fe$_3$(B,P,C)) portion and B shows the Fe$_3$(B,C) portion. At boundary areas of the (Fe + Fe$_3$ (B,P,C)) portion, there are formed non-metallic inclusions having a higher P concentration than at the central area, as seen from FIG. 5.

Tests pieces used for this analysis were those prepared by conducting the sintering in a hydrogen gas atmosphere as in Example 3. Of course, similar results can be obtained by conducting the analysis on test pieces prepared by conducting the sintering in other atmosphers such as an argon gas atmosphere or in vacuum.

The abrasion test mentioned in the foregoing examples was carried out in the following manner:

A test piece having a convex end face of a radius of curvature of 3 mm (base = 3 mm, length = 15 mm) was pressed under a force of 1.8 kg or to a chromium-plated rotating disc so that the convex portion of the test piece impinged vertically to the disc. The disc was rotated so that at the point of contact it slides past the test piece at a speed of 19.8 m/sec. The test was conducted in the absence of a lubricating oil for 10 min. The degree of abrasion was measured. In FIG. 1, the results of the abrasion test made on the comparative product 1, which was high phosphorus cast iron comprising 3.0% of C, 0.6% of P, 2.0% of Si and 0.8% of Mn, the balance being Fe, and the comparative product 2, which was a sintered product of an alloy formed by dispersing 10% of MoS$_2$ in a Cu-Sn alloy, are also shown.

As is apparent from the foregoing illustration. since the sliding material of this invention is prepared by sintering two ternary eutectic alloy powders, it not only exhibits effects inherent in sintered products but also has pores smaller than and a degree of porosity lower than attainable in the conventional sintered products and exhibits high abrasion resistance as shown in FIG. 1. In addition, in the sliding material of this invention, since the metal portion causing undesired seizure is encircled by a non-metallic portion having a high P content, sufficient anti-seizure property and strength can be attained. Especially when the mating material is a chromium plated article, the sliding material of this invention is especially compatible with and does not damage a chromium plated mating material.

What is claimed is:

1. An abrasion-resistant sliding material having a structure including (Fe + Fe$_3$(B,P,C)) portions and Fe$_3$(B,C) portons, which is formed by molding a powdery alloy mixture comprising 70 to 98% by weight of a powdery eutectic alloy of particle size finer than 200 mesh and comprising 0.2 to 3.0% by weight of boron and 1.0 to 4.0% by weight of carbon with the balance being iron, and 2 to 30% by weight of a powdery eutectic alloy of particle size finer than 200 mesh and comprising 3.0 to 7.0% by weight of a phosphorus and 0.5 to 2.5% by weight of carbon with the balance being iron, into a desired shape under a compression pressure of 0.5 to 3.0 t/cm², and sintering the molded alloy mixture at a temperature of 950° to 1130° C, for at least 5 minutes.

2. An abrasion-resistant sliding material as set forth in claim 1 wherein the (Fe + Fe$_3$(B,P,C)) portions the P content is higher at boundary areas than at central areas.

3. An abrasion-resistant sliding material as set forth in claim 1 wherein the structure includes pores and the porosity is not higher than 7.0%.

4. An abrasion-resistant sliding material as set forth in claim 3 wherein the pores have a diameter not exceeding 50μ.

5. An abrasion-resistant sliding material as set forth in claim 1 wherein in the starting powdery alloy mixture, the proportion of the phosphorus-containing eutectic alloy powder is 5 to 20% by weight.

6. An abrasion-resistant sliding material as set forth in claim 1 wherein the sintering is carried out in vacuum.

7. An abrasion-resistant sliding material as set forth in claim 1 wherein the sintering is carried out in the presence of an inert gas selected from the group consisting of argon, nitrogen, hydrogen, and an ammonia decomposition gas.

8. A method of producing an abrasion-resistant sliding material comprising forming a powdery mixture consisting of (a) about from 70 to 98%, by weight, of a first eutectic alloy consisting of about from 0.2 to 3.0%, by weight, of boron, about from 1.0 to 4.0%, by weight of carbon, and the balance being iron, said first eutectic alloy having a particle size finer than 200 mesh, and (b) about from 2 to 30%, by weight, of a second eutectic alloy consisting of about from 3.0 to 7.0%, by weight, of phosphorus, about from 0.5 to 2.5%, by weight, of carbon, and the balance being iron, said second eutectic alloy also having a particle size finer than 200 mesh, compression molding the resulting mixture into a desired shape at a compression pressure of about from 0.5% to 3.0 t/cm², and sintering the resulting molded product at a temperature of about from 950° to 1130° C. for at least 5 minutes in an atmosphere of an inert gas or in a vaccum, to obtain a product characterized in that its structure includes portions of iron compounds [Fe$_3$(B,C)], portions where iron and iron compounds are copresent [Fe + Fe$_3$ (B,P,C)], and portions of fine pores, and wherein its porosity does not exceed about 7.0% and the pore size does not exceed 50μ in diameter.

* * * * *